(12) United States Patent
Takano

(10) Patent No.: US 9,214,657 B2
(45) Date of Patent: Dec. 15, 2015

(54) POWER STORAGE DEVICE AND POWER STORAGE SYSTEM

(75) Inventor: Junichi Takano, Fukushima (JP)

(73) Assignee: Sony Corporation, Tokyo (JP)

( * ) Notice: Subject to any disclaimer, the term of this patent is extended or adjusted under 35 U.S.C. 154(b) by 732 days.

(21) Appl. No.: 13/589,860

(22) Filed: Aug. 20, 2012

(65) Prior Publication Data

US 2013/0057074 A1 Mar. 7, 2013

(30) Foreign Application Priority Data

Sep. 1, 2011 (JP) ................................. 2011-191054

(51) Int. Cl.
*H02J 7/00* (2006.01)
*H01M 2/10* (2006.01)
*H01M 10/6551* (2014.01)

(52) U.S. Cl.
CPC ........ *H01M 2/1072* (2013.01); *H01M 10/6551* (2015.04); *Y10T 307/625* (2015.04)

(58) Field of Classification Search
CPC ............ H01M 2/1072; H01M 10/6551; Y10T 307/625
USPC ......................................................... 307/150
See application file for complete search history.

(56) References Cited

U.S. PATENT DOCUMENTS

| | | | |
|---|---|---|---|
| 5,832,988 A * | 11/1998 | Mistry et al. .................. | 165/103 |
| 7,046,513 B2 * | 5/2006 | Nishiyama et al. ............ | 361/695 |
| 7,508,663 B2 * | 3/2009 | Coglitore ...................... | 361/695 |
| 7,857,688 B1 * | 12/2010 | Cunningham et al. ........ | 454/184 |
| 2012/0235631 A1 * | 9/2012 | Nakashima et al. .......... | 320/107 |

FOREIGN PATENT DOCUMENTS

| | | |
|---|---|---|
| CN | 202906500 | 4/2013 |
| JP | HEI 11-325546 | 11/1999 |
| JP | 2003-071775 | 3/2003 |

OTHER PUBLICATIONS

Notification of the First Office Action issued in connection with Chinese Patent Application No. 2012103042007, dated Aug. 26, 2015, (12 pages).

* cited by examiner

*Primary Examiner* — Jared Fureman
*Assistant Examiner* — Duc M Pham
(74) *Attorney, Agent, or Firm* — K&L Gates LLP

(57) ABSTRACT

Provided is a power storage device including: a first chassis member; a second chassis member; a power inlet; one or plural power outlets; a battery module; a power conversion device; a housing; a lower lid; and an upper lid. The battery module is fixed closely to one surface of the first main surface portion. The power conversion device is fixed closely to one surface of the second main surface portion. A gap portion is formed between the first main surface portion and the second main surface portion by disposing the other surface of the first main surface portion and the other surface of the second main surface portion to face each other. The space is used to make air taken through the plural openings of the lower lid flow via the plural openings of the upper lid.

17 Claims, 10 Drawing Sheets

POWER STORAGE DEVICE AND POWER STORAGE SYSTEM

CROSS REFERENCES TO RELATED APPLICATIONS

The present application claims priority to Japanese Priority Patent Application JP 2011-191054 filed in the Japan Patent Office on Sep. 1, 2011, the entire content of which is hereby incorporated by reference.

BACKGROUND

The present application relates to a power storage device which is provided with a plug outlet for electronic equipment and is capable of supplying electric power to the electronic equipment. The present application also relates to a power storage system which uses the power storage device.

When a power failure occurs at the time of, for example, disaster, users are not able to use electricity until power transmission to each home is resumed. During the power failure, dry batteries (i.e., primary batteries or secondary batteries) are used widely. However, these batteries have small capacity and therefore are able to be used only for the operation and charging of portable electronic devices.

Recently, power generation devices using energy of nature, such as photovoltaic power generation devices for homes and wind power generation devices for homes, are proposed as private electric generators. However, these power generation devices are expensive for home use and therefore are not widely used in ordinary homes. Under such conditions, a power storage device provided with a battery module having a combination of plural secondary batteries, or electronic equipment with a power storage system having a function to store electricity are proposed.

The power storage device charges the battery module in, for example, the nighttime during which electricity demand is low, or a period when the power storage device is not used, and supplies power to electronic equipment connected to the power storage device as necessary. The electronic equipment with a power storage system charges the battery module in, for example, the nighttime during which electricity demand is low, or a period when the electronic equipment with a power storage system is not used, and operates without using external supply of electricity at the time of the peak of electricity demand or at the time of a power failure.

Such a power storage device or electronic equipment with a power storage system is provided with a battery module having many secondary batteries incorporated therein and a power conversion device, such as an inverter and a converter. The power conversion device generates an especially large amount of heat and the inside of the device is likely to be exposed to high temperature. Further, since plural secondary batteries are connected, the battery module is likely to be exposed to high temperature at the time of charging. When the battery module is left in a high-temperature environment, gas may be produced inside the battery or safety is threatened due to decomposition of a separator or heat contraction. Further, abnormal heat generation may occur in the battery itself and thermal runaway of the battery may be caused. Therefore, the risk may be increased.

In order to overcome these problems, in air conditioning equipment with a power storage system of Japanese Unexamined Patent Application Publication No. 11-325546, a power converter circuit portion which generates a large amount of heat is disposed at a position higher than a storage battery including plural secondary batteries. An outside air inlet is provided at a lower portion of the device and an outlet is provided at an upper portion of the device. With this configuration, air is made to flow inside the device such that heat in the power converter circuit portion which generates a large amount of heat is efficiently released outside. The heat in the power converter circuit portion is less easily transmitted to the storage battery by an insulating member provided between the power converter circuit portion and the storage battery.

As described in Japanese Unexamined Patent Application Publication No. 2003-071775, providing a dead-air space as a heat releasing mechanism between the battery as a driving power source and a heat source, such as a control circuit board, has been proposed. In Japanese Unexamined Patent Application Publication No. 2003-071775, a housing which contains the battery is thickened on the side of the dead-air space to form a thermal insulation surface. The thermal insulation surface and the dead-air space form a double thermal insulation configuration. The other surface of the housing, which is thin, is formed as a heat sink surface.

SUMMARY

However, when only the configuration of Japanese Unexamined Patent Application Publication No. 11-325546 is applied, the heat in the power converter circuit portion is easily transmitted to the storage battery. Further, there is a possibility that temperature distribution is caused among the storage batteries and therefore a difference is produced in battery degradation.

The device of Japanese Unexamined Patent Application Publication No. 2003-071775 is a robot device and the amount of heat generated in the driving power source or in the control circuit board is not large: therefore, it is possible that a cooling function is sufficiently carried out by placing a thermal insulation surface to face a heat source and radiating heat from other surfaces. The power storage device has a large number of secondary batteries contained therein and therefore an amount of heat generated in the power conversion device is significantly large. For this reason, it is possible that only application of the thermal insulation configuration of Japanese Unexamined Patent Application Publication No. 2003-071775 is not sufficient.

It is desirable to provide a power storage device and a power storage system having enhanced heat-radiating ability.

A power storage device according to the present application includes: a first chassis member which is formed from a metallic material and is provided with a vertically extending first main surface portion, and first and second side surface portions formed to extend from each of side edges of the first main surface portion substantially vertically to the first main surface portion; a second chassis member which is formed from a metallic material and is provided with a second main surface portion which faces the main surface portion of the first chassis member, and third and fourth side surface portions formed to extend from each of side edges of the second main surface portion substantially vertically to the second main surface portion; a power inlet capable of inputting either of DC power or AC power; one or plural power outlets to which a plug of electronic equipment is capable of being connected; a battery module to which one or plural secondary batteries are connected and which is charged by being supplied with the power input from the power inlet; a power conversion device which is electrically connected to the battery module, and which converts the power input from the battery module into desired power and outputs the converted power to the one or plural power outlets; a housing which contains the battery module, the power conversion device, the first chassis member, the second chassis member, the power inlet and the one or plural power outlets, and makes the power inlet and the power outlet be exposed outside; a lower lid which is formed integrally with or is fit into the housing on a bottom surface side of the housing and is provided with plural openings; and an upper lid which is formed integrally with or is fit into an upper surface side of the housing and is provided with plural openings, wherein: the battery module is fixed closely to one surface of the first main surface portion of the first chassis member; the power conversion device is fixed closely to one surface of the second main surface portion of the second chassis member; and a gap portion is formed between the first main surface portion and the second main surface portion by disposing the other surface of the first main surface portion of the first chassis member and the other surface of the second main surface portion of the second chassis member to face each other, the space being open at a bottom surface side and an upper surface side and being used for making air taken through the plural openings of the lower lid flow via the plural openings of the upper lid.

In a power storage system of this application, power is supplied from the power storage device described above or power is supplied to the power storage device from a power generation device or a power network.

In the power storage device of the present application, a gap portion is formed between a battery module and a power conversion device which generates a large amount of heat. This gap portion is used as a flow channel of air taken through an opening formed on a lower surface of the device, and the air is exhausted from an opening formed on an upper surface of the device. Therefore, heat may be effectively radiated from the battery module and from the power conversion device.

A first chassis member and a second chassis member which constitute the gap portion are made from a metallic material. A battery module and a power converter circuit are fixed closely to the first chassis member and the second chassis member, respectively. With this configuration, heat in the battery module and the power converter circuit may be radiated more efficiently via the first chassis member and the second chassis member.

The present application provides a power storage device and a power storage system having enhanced heat-radiating ability.

Additional features and advantages are described herein, and will be apparent from the following Detailed Description and the figures.

DETAILED DESCRIPTION

Hereafter, the best forms (hereafter, referred to as "embodiments") for implementing the present application will be described. Description will be provided in the following order.

1. First Embodiment (Exemplary Power Storage Device of the Present Application)

2. Second Embodiment (Exemplary Power Storage System using Power Storage Device of the Present Application)

1. First Embodiment 1-1. Configuration of Power Storage Device

Figure 1:
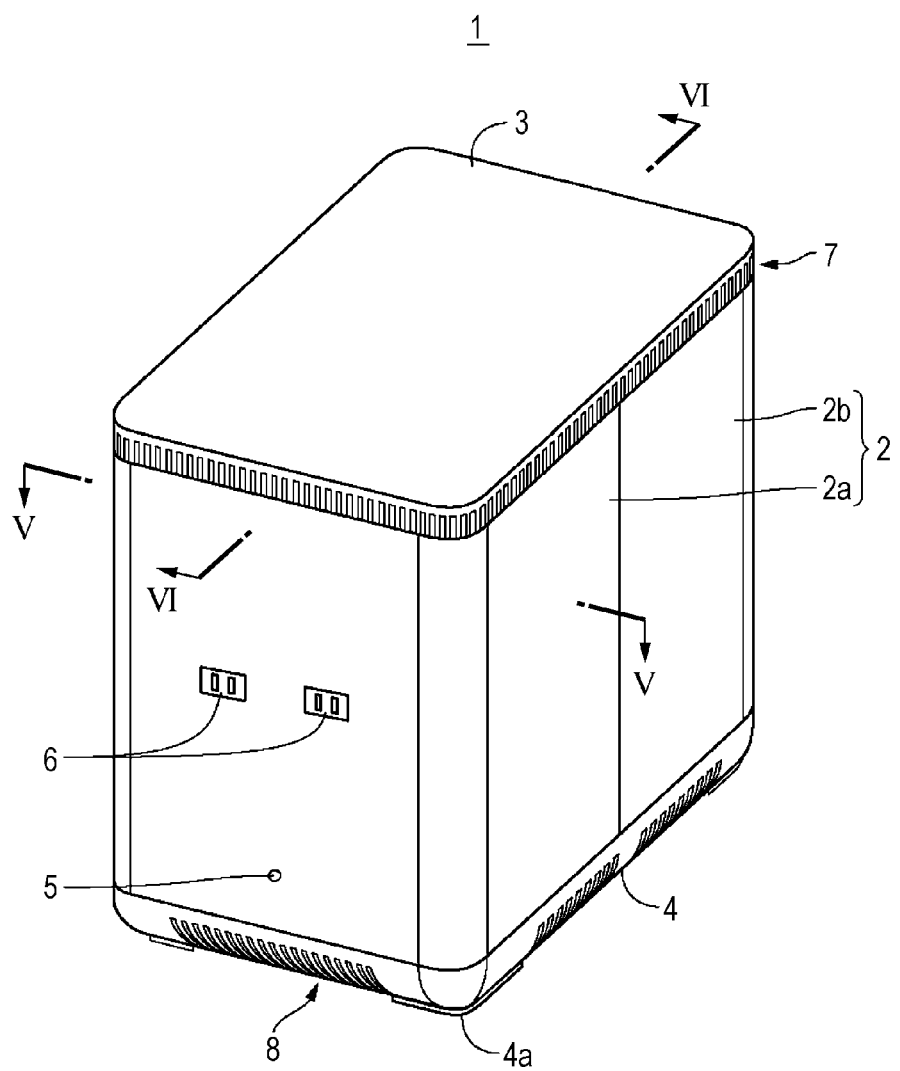
FIG. 1 is a perspective view of an exterior of a power storage device according to a first embodiment.
Figure 2A:
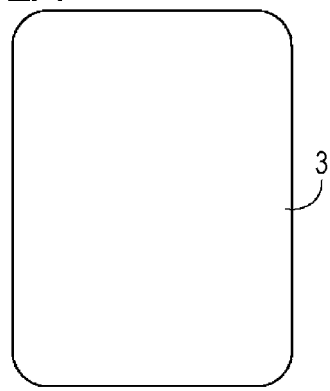
FIGS. 2A, 2B, 2C and 2D are a front view, a top view, a bottom view and a side view, respectively, of the power storage device according to the first embodiment.
Figure 2B:
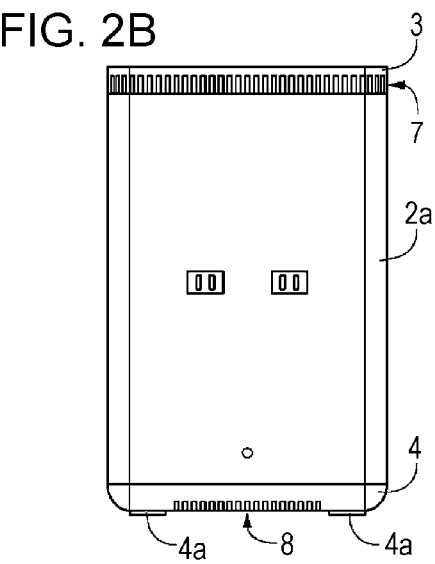
Figure 2D:
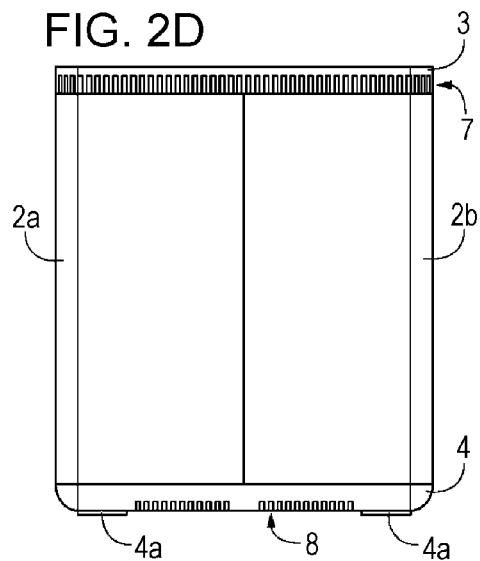
Figure 2C:
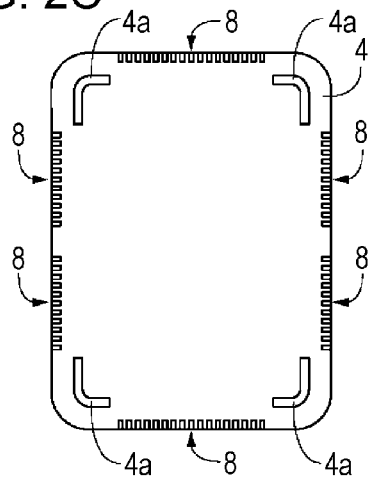
Figure 3:
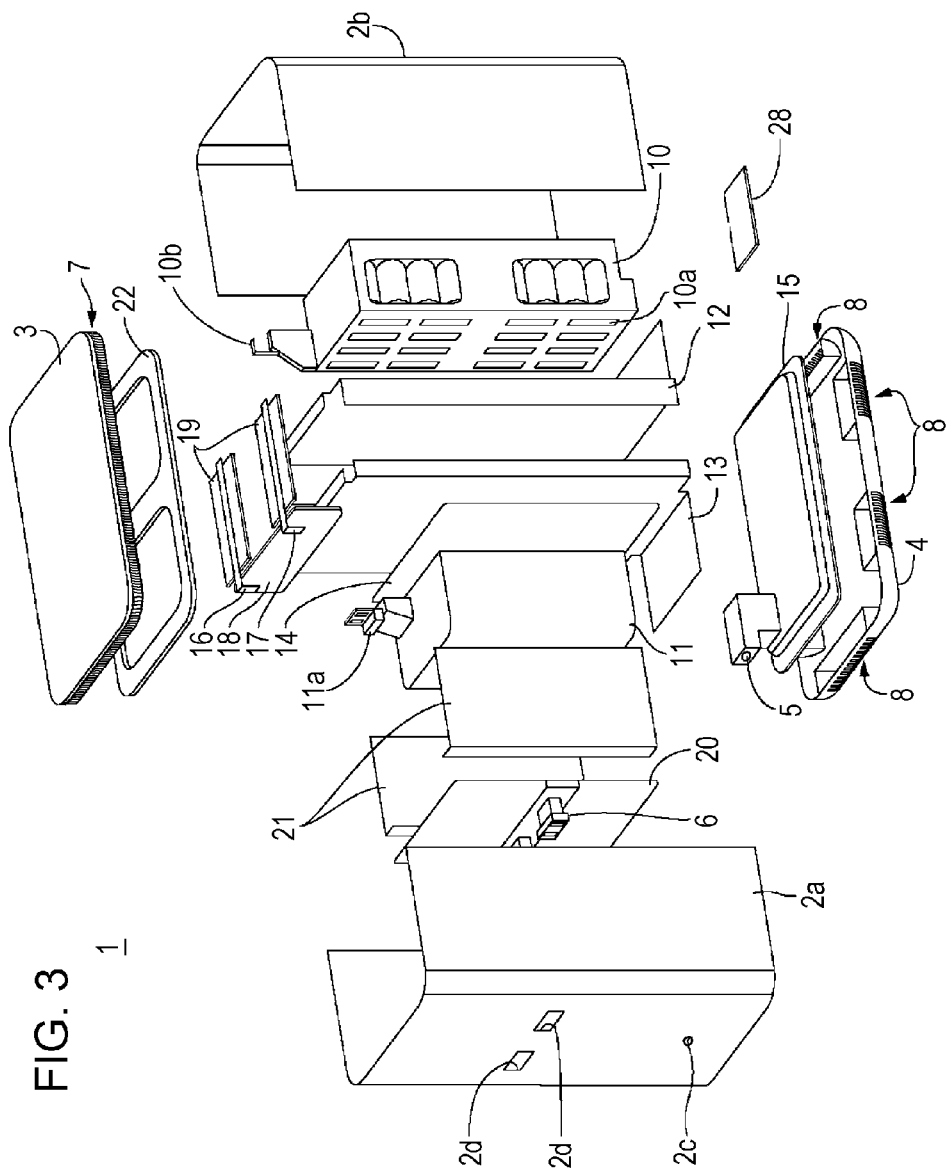
FIG. 3 is an exploded perspective view of a configuration of the power storage device according to the first embodiment.

FIG. 1 is a perspective view of an exterior of a power storage device 1 according to the first embodiment. FIG. 2A is a top view of the power storage device 1, FIG. 2B is a front view of the power storage device 1, FIG. 2C is a bottom view of the power storage device 1 and FIG. 2D is a side view of the power storage device 1. Right and left side surfaces of the power storage device 1 are the same in configuration with each other and, therefore, FIG. 2D illustrates both of the right and left side surfaces. FIG. 3 is an exploded perspective view of a configuration of the power storage device 1.

The exterior of the power storage device 1 is constituted by a housing 2, an upper lid 3 and a lower lid 4. A power inlet 5 and one or plural power outlets 6 are provided on the front of the power storage device 1. DC power or AC power from a power generation device or commercial power supply may be input through the power inlet 5. Plugs of electronic equipment may be connected to the power outlets 6.

The housing 2 includes, for example, a pair of housing 2a and housing 2b which are two divided portions. In FIGS. 1 to 3, the housing 2a covers the front of the power storage device. An opening 2c for exposing the power inlet 5 to the outside and one or plural openings 2d for exposing the power outlets 6 to the outside are provided on the front of the housing 2a.

The housing 2 may be made of, for example, a molded resin material. The housing 2 may be made from any resin materials that, for example, have intensity suited for an exterior member of the power storage device 1 and have certain moldability. The housing 2 may be made from, for example, polycarbonate (PC) and polypropylene (PP). A protrusion may be provided at a suitable position on an inner wall of the housing 2. This configuration may enhance ability to radiate heat in the power storage device 1 outside via the housing 2. The housing 2 may be made from a highly heat-conductive resin material: in that case, heat-radiating ability of the housing 2 may be further enhanced.

Alternatively, the housing 2 may be made from a press-molded metal plate. Metallic materials used for the metal plate may be, for example, aluminum, stainless steel and iron. The pair of housing 2a and housing 2b which is two divided portions may be formed by only bending a rectangular metal plate into U shape and providing necessary openings. Therefore, the housings 2a and 2b may be fabricated in a simple manner. Since metallic materials have heat-radiating ability which is higher than that of resin materials, the housing 2 made from a metallic material may have enhanced heat-radiating ability. For this reason, it is more desirable to use a metal plate for the housing 2.

Protrusion and indentation may be provided by, for example, pressing at suitable positions on the inner wall of the housing 2. This configuration may enhance ability to radiate heat in the power storage device 1 outside via the housing 2. The protrusion and indentation may be provided on an outer surface of the housing 2. This configuration may be desirable in appearance and heat-radiating ability.

The upper lid 3 covers upper surfaces of the housing 2a and the housing 2b and is provided with plural outlets which are formed as, for example, slits (hereafter, may be referred to as "exhaust slit 7"). The upper lid 3 is provided with an upper surface portion as a top plate of the power storage device 1, and a side surface portion extending downward from an end of the upper surface portion. The exhaust slits 7 are desirably provided in the side surface portion. This is because liquid materials from outside do not easily enter compared with a configuration in which the exhaust slits 7 are formed in the upper surface portion. The upper lid 3 may be made of, for example, a molded resin material. The upper lid 3 may be made from, for example, polycarbonate (PC) and polypropylene (PP).

The lower lid 4 covers lower surfaces (i.e., bottom surfaces) of the housings 2a and 2b and is provided with plural inlets which are formed as, for example, slits (hereafter, may be referred to as "intake slit 8"). The lower lid 4 may be provided with plural legs 4a which touch the ground when the power storage device 1 is placed on, for example, a floor. Alternative to or in addition to the legs 4, a pad having high adhesion to a surface on which the power storage device 1 is placed may be provided on bottom surfaces of the legs 4 for the prevention of overturning of the power storage device 1.

The lower lid 4 is provided with a bottom surface portion used as a bottom plate of the power storage device 1, and a side surface portion extending upward from an end of the bottom surface portion. The intake slits 8 are desirably provided in the side surface portion. The bottom surface portion and the side surface portion may continue each other in a rounded manner. In this case, the intake slits 8 may be provided successively over a range from the side surface portion to the bottom surface portion. If the lower lid 4 is placed on, for example, a floor, the bottom surface portion is in close contact with the floor or faces the floor via a slight gap. For this reason, if the intake slits 8 are formed in the bottom surface portion, there is a possibility an amount of air taken in the power storage device 1 is insufficient. Therefore, the intake slits 8 are desirably provided at suitable positions in accordance with the configuration of the lower lid 4.

The lower lid 4 may be made of, for example, a molded resin material. The lower lid 4 may be made from, for example, polycarbonate (PC) and polypropylene (PP) similarly to the upper lid 3.

The width of the exhaust slits 7 provided in the upper lid 3 and the width of the intake slits 8 provided in the lower lid 4 are desirably is 0.5 mm or greater and 2.5 mm or narrower. If the slit width is narrower than 0.5 mm, there is a possibility that an air intake function and an exhaust function are affected. If the slit width is greater than 2.5 mm, liquid materials may easily enter from outside.

Figure 4:
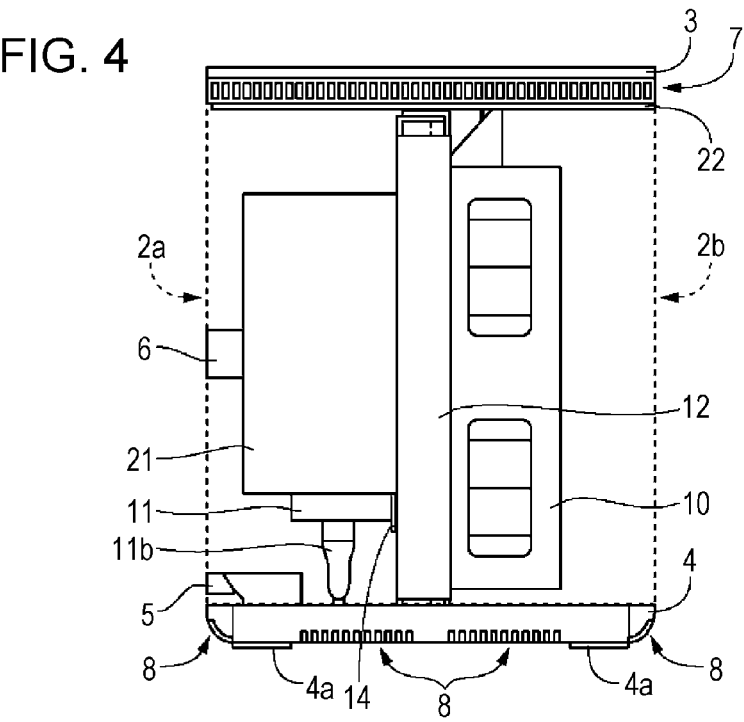
FIG. 4 is a side view of the power storage device according to the first embodiment with a housing being removed.
Figure 5:
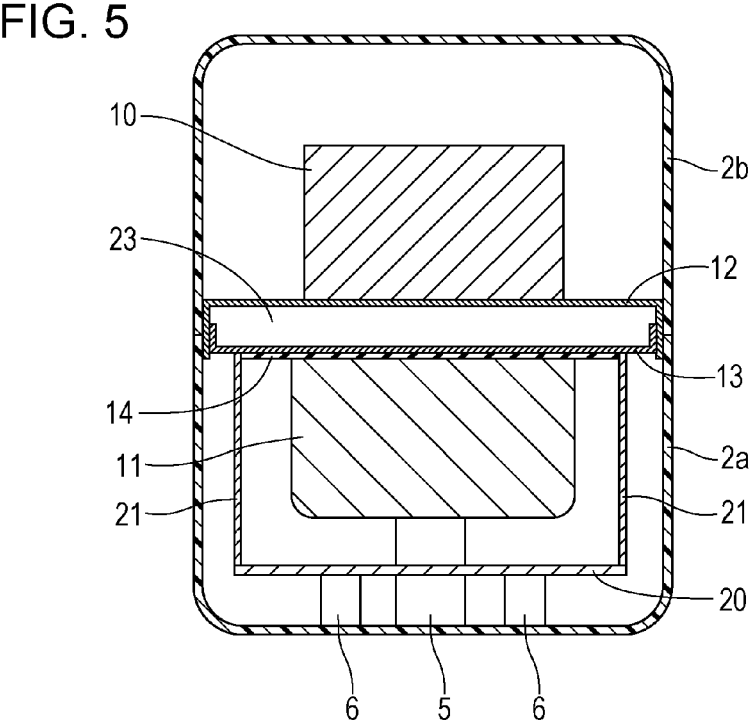
FIG. 5 is a transverse cross-sectional view of the power storage device according to the first embodiment along line V-V of FIG. 1.
Figure 6:
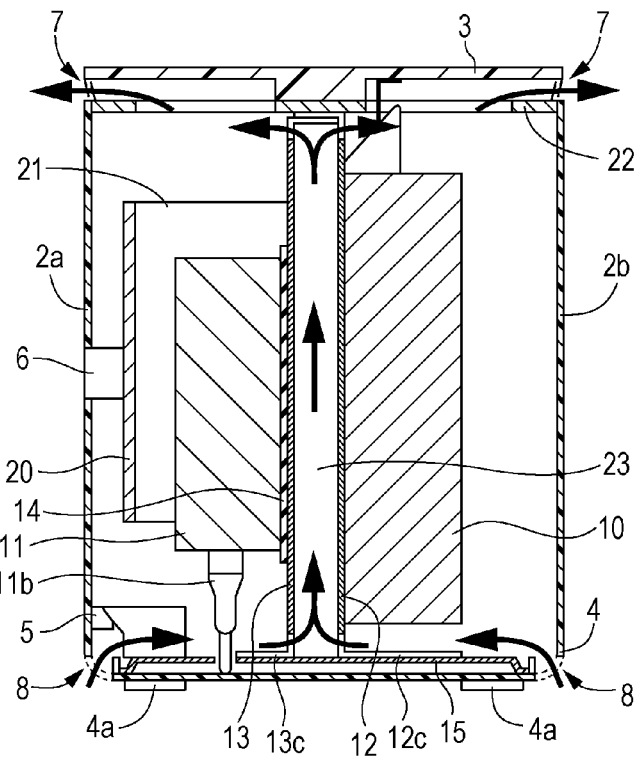
FIG. 6 is a longitudinal cross-sectional view of the power storage device according to the first embodiment along line VI-VI of FIG. 1.

Hereafter, an internal configuration of the power storage device 1 will be described. FIG. 4 is a side view of the power storage device 1 with housings 2a and 2b being removed. FIG. 5 is a transverse cross-sectional view of the power storage device 1 taken along line V-V of FIG. 1. FIG. 6 is a longitudinal cross-sectional view of the power storage device 1 taken along line VI-VI of FIG. 1.

As illustrated in FIGS. 3 and 4, the power storage device 1 includes therein a battery module 10 provided mainly with plural secondary batteries, an inverter 11 which is a power conversion device, a chassis member 12, a chassis member 13, a power inlet 5 and a power outlet 6. As illustrated in FIG. 5, the chassis member 12 and the chassis member 13 are disposed and fixed to face each other with a gap portion 23 being formed therebetween.

In the longitudinal cross-sectional view of the power storage device 1 of FIG. 6, an air flow in a radiation mechanism according to the present application is illustrated by arrows. In the power storage device 1 of the present application, the gap portion 23 is formed between the battery module 10 and the inverter 11 which generates a large amount of heat by the chassis member 12 and the chassis member 13. The gap portion 23 is used as a flow channel of air taken through the intake slits 8 formed in the lower lid 4 of the power storage device 1. The gap portion 23 is formed by the chassis member 12 fixed closely to the battery module 10, and the chassis member 13 fixed closely to the inverter 11. Since the battery module 10 and the chassis member 12 are in close contact, heat in the battery module 10 is efficiently transferred to the chassis member 12 and the chassis member 12 is heated. The heat in the inverter 11 is efficiently transferred to the chassis member 13 and the chassis member 13 is heated. With this configuration, when the air flows through the gap portion 23, the chassis member 12 and the chassis member 13 may be cooled. In this manner, the heat in the battery module 10 and the inverter 11 is radiated. The air flowed through the gap portion 23 is heated and flows upward, and is then exhausted outside of the power storage device 1 from the exhaust slits 7 of the upper lid 3. The radiation mechanism is provided in which air is taken through the intake slits 8 formed in the lower lid 4, flows through the gap portion 23 and is exhausted through the exhaust slits 7 of the upper lid 3.

Although not illustrated in FIG. 6, a part of the air taken from the intake slits 8 formed in the lower lid 4 flows through a space formed by the housing 2a and the chassis member 13 (i.e., a space to which the inverter 11 is fixed). Therefore, heat is radiated also from surfaces of the inverter 11 other than the surface at the side of the chassis member 13. Similarly, a part of the air taken through the intake slits 8 formed in the lower lid 4 flows through a space formed by the housing 2b and the chassis member 12 (i.e., a space to which the battery module 10 is fixed). Therefore, heat is radiated also from surfaces of the battery module 10 other than the surface at the side of the chassis member 12.

Chassis Member

Figure 7:
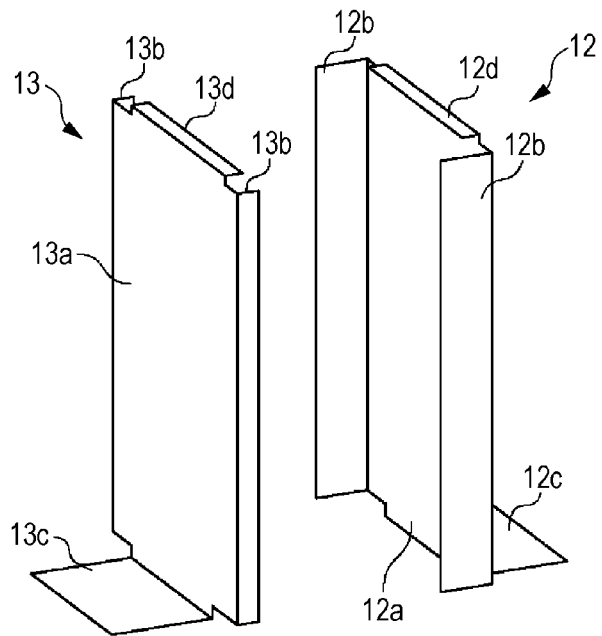
FIG. 7 is a perspective view of a configuration of a chassis member used in the power storage device according to the first embodiment.

The chassis member 12 is made from a metallic material and, as illustrated in FIG. 7, is provided with a main surface portion 12a and side surface portions 12b. The battery module 10 is fixed closely to the main surface portion 12a. The side surface portions 12b are formed to extend from side edges of the main surface portion 12a substantially vertically to the main surface portion 12a. The side surface portions 12b are formed to extend toward the chassis member 13. The chassis member 12 is provided with a fixing portion 12c which is formed to extend substantially vertically to the main surface portion 12a from a lower end of the main surface portion 12a. The fixing portion 12c is formed to extend from the chassis member 12 on the side on which the battery module 10 is fixed. The chassis member 12 may further be provided with a fixing portion 12d which is formed to extend substantially vertically to the main surface portion 12a from an upper end of the main surface portion 12a. The fixing portion 12d is formed to extend toward the chassis member 13.

The chassis member 13 is made from a metallic material and, as illustrated in FIG. 7, is provided with a main surface portion 13a and side surface portions 13b. The inverter 11 is fixed closely to the main surface portion 13a. The side surface portions 13b are formed to extend from side edges of the main surface portion 13a substantially vertically to the main surface portion 13a. The side surface portions 13b are formed on the side of the chassis member 12. The chassis member 13 is provided with a fixing portion 13c which is formed to extend substantially vertically to the main surface portion 13a from a lower end of the main surface portion 13a. The fixing portion 13c is formed to extend from the chassis member 13. The fixing portion 12c is formed to extend from the chassis member 12 on the side on which the inverter 11 is fixed. The chassis member 13 may further be provided with a fixing portion 13d which is formed to extend substantially vertically to the main surface portion 13a from an upper end of the main surface portion 13a. The fixing portion 13d is formed to extend toward the chassis member 12.

The chassis member 12 and the chassis member 13 are fixed to each other with the side surface portions 12b of the chassis member 12 and the side surface portions 13b of the chassis member 13 being fixed to each other. In this manner, the gap portion 23 is formed between the chassis member 12 and the chassis member 13. In a configuration in which the fixing portion 12d of the chassis member 12 and the fixing portion 13d of the chassis member 13 are provided, the fixing portion 12d and the fixing portion 13d may be fixed to each other. The side surface portions 12b and the side surface portions 13b, or the fixing portion 12d and the fixing portion 13d are fixed to each other by, for example, screws. Desirably, as illustrated in FIG. 5, the side surface portions 12b of the chassis member 12 and the side surface portions 13b of the chassis member 13, and the housing 2a and the housing 2b are fixed together.

The width of the gap portion 23 is desirably 5 mm or greater and 30 mm or narrower. If the width of the gap portion is narrower than 5 mm, heat-radiating ability of the present application is affected. If the width of the gap portion is greater than 30 mm, the power storage device 1 may be large in size.

The chassis member 12 is fixed to the base 15 with the fixing portion 12c and the base 15 being fixed to each other by, for example, screws. Similarly, the chassis member 13 is fixed to the base 15 with the fixing portion 13c and the base 15 being fixed to each other by, for example, screws. The base 15 is fixed to the lower lid 4.

As illustrated in FIG. 4, the fixing portion 12d and the fixing portion 13d may be fixed to an upper lid mounting member 22 directly or via another member. The fixing portion 12d and the fixing portion 13d may be fixed to the upper lid 3 directly or via another member. The upper lid mounting member 22 is fixed to the chassis member 12 and to the chassis member 13. The upper lid mounting member 22 is further fixed to the upper lid 3. The upper lid 3 is fit into the housing 2a and the housing 2b.

As described above, since the chassis member 12 and the chassis member 13 are fixed to each other and, at the same time, to other components of the power storage device 1, the chassis member 12 to which the heavy battery module 10 is fixed and the chassis member 13 to which the heavy inverter 11 is fixed may be reliably fixed within the power storage device 1.

This configuration may have increased withstand load of the upper lid 3.

The side surface portions 12b of the chassis member 12 and the side surface portions 13b of the chassis member 13, and the housing 2a and the housing 2b are fixed together, and the space formed by the housing 2a and the chassis member 13 and the space formed by the housing 2b and the chassis member 12 are separated from each other. With this configuration, if an electrolyte leaks from the battery module 10, the electrolyte does not easily flow toward a circuit board. Therefore, the electrolyte does not easily adhere to the circuit board.

Power Inlet

The power inlet 5 is fixed to, for example, the base 15. The power inlet 5 is connected to the battery module 10 via a relay board 28. DC power, for example, is input to the power inlet 5. AC power may be input to the power inlet 5 if a converter is provided between the power inlet 5 and the battery module 10.

Battery Module

The battery module 10 includes plural secondary batteries connected in series, in parallel or in series parallel and contained in an exterior case. Each of the second batteries is charged by the DC power input to the power inlet 5. The secondary battery may be, for example, a rechargeable lithium-ion battery. Although cylindrical batteries are illustrated in FIG. 3 as the secondary batteries which constitute the battery module 10, the shape of the second batteries is not limited to the same: for example, thin batteries laminated with film may be used.

Charge of each second battery of the battery module 10 is controlled by the relay board 28 which is electrically connected between the power inlet 5 and the battery module 10. Charge control is carried out in the same manner as the method of charging the related art secondary battery.

The battery module 10 is electrically connected to the circuit board 18 by a positive electrode lead 16 and a negative electrode lead 17. A terminal board 11a of the inverter 11 is also connected to the circuit board 18. With this configuration, discharge electricity output from the battery module 10 may be input to the inverter 11 via the circuit board 18. The positive electrode lead 16 and the negative electrode lead 17 are connected to the circuit board 18 provided on an outer surface of the chassis member 13 along a terminal board 19 via, for example, an upper surface of the chassis member 12 and an upper surface of the chassis member 13, respectively. Positions at which the circuit board 18, the positive electrode lead 16 and the negative electrode lead 17 are disposed may be determined arbitrarily.

The battery module 10 may be provided with a heat-radiation member 10a disposed on a surface on the side of the chassis member 12. The heat-radiation member 10a is made of, for example, silicon and has a function to efficiently transfer heat of the plural secondary batteries to the chassis member 12. Desirably, the heat-radiation member 10a is incorporated in the battery module 10 and is at least partially exposed to side of the chassis member 12. Alternatively, the heat-radiation member 10a may be prepared as a separate member and disposed between the battery module 10 and the chassis member 12 when the battery module 10 and the chassis member 12 are fixed to each other.

The exterior case of the battery module 10 is made of, for example, a resin material, such as polycarbonate (PC) and polypropylene (PP). It is only necessary that the exterior case is capable of fixing the secondary batteries which constitute the battery module 10. The exterior case may be formed to partially expose the secondary batteries so as to enhance heat-radiating ability of the secondary batteries. If the color of the exterior case is black, heat-radiating ability may be enhanced.

The battery module 10 may include a connector 10b in an upper portion thereof and may be connected to the upper lid 3 or to the upper lid mounting member 22. With this configuration, the battery module 10 is more firmly fixed within the power storage device 1.

Inverter

The inverter 11 is electrically connected between the battery module 10 and the power outlet 6 and converts, for example, discharge electricity input from the battery module 10 into AC power. The inverter 11 is electrically connected to a main board 20 in which the power outlet 6 is formed via a connecting cord 11b.

Desirably, the inverter 11 is fixed to the chassis member 13 via an insulating member 14 when the inverter is fixed to the chassis member 13. This is because, since the chassis member 13 is made from a metallic material, it is desirable that the inverter 11 and the chassis member 13 are mutually insulated in a reliable manner. The insulating member 14 is made of resin materials, such as polycarbonate (PC) and polypropylene (PP). If the color of the insulating member 14 is black, heat-radiating ability may be enhanced.

It is only necessary that the device electrically connected between the battery module 10 and the power outlet 6 is a power conversion device which converts power input from the battery module 10 into desired power. A DC-DC converter which outputs direct current may be used instead of the inverter 11.

Power Outlet

One or plural power outlets 6 are provided on the main board 20. The power outlet 6 is formed in a shape of an outlet in which a plug of electronic equipment may be inserted. Therefore, electronic equipment which usually operates with power supplied from a commercial power supply, such as a portable electronic device and home electronic equipment, may be used by connecting to the power storage device 1.

The main board 20 is fixed to a pair of board mounting members 21 attached to the chassis member 13. Therefore, the main board 20 is attached to a position to be exposed to the outside through an opening 2d of the housing 2a. The main board 20 is fixed to the pair of board mounting members 21 such that the power outlet 6 is located at a position to be exposed to the outside through the opening 2d. Desirably, the power outlet 6 is disposed on a side surface of the power storage device 1 in order to prevent entering of liquid materials.

Each member of the power storage device 1 of the present application may be fixed using generally used methods, such as screwing and fitting. Screwing is especially desirable.

1-2. Modification of Power Storage Device

The power storage device 1 may have the following configurations.

1-2-1. First Modification

Figure 8:
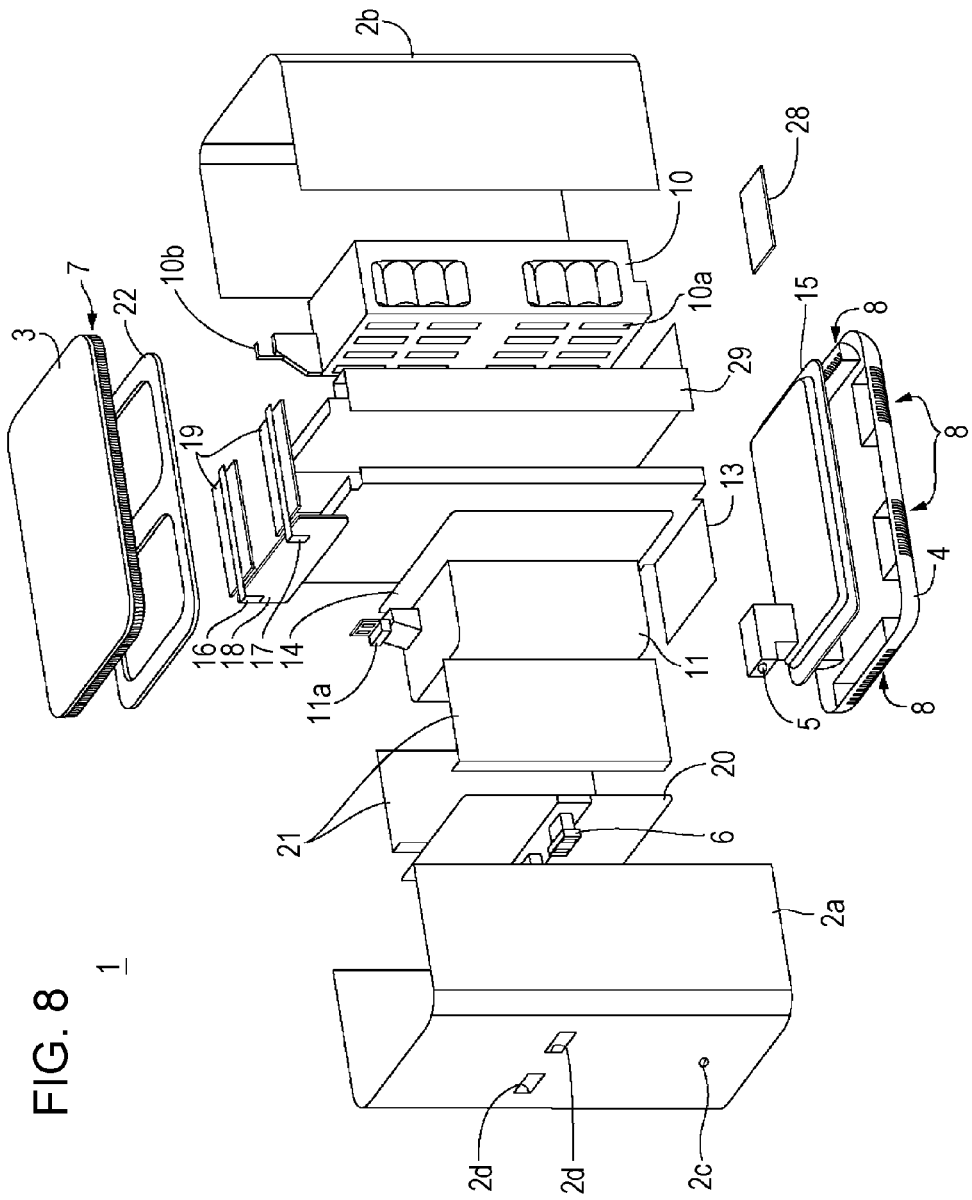
FIG. 8 is an exploded perspective view of a configuration of a power storage device according to another exemplary configuration.
Figure 9:
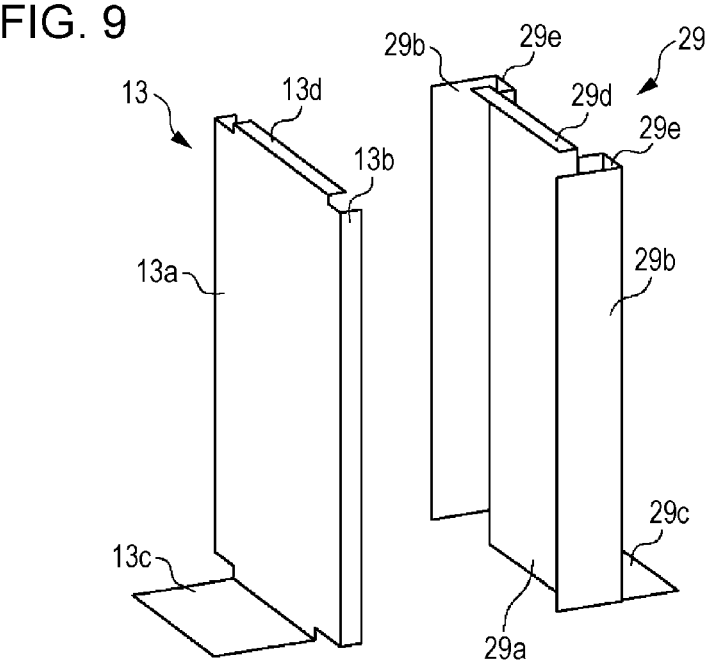
FIG. 9 is a perspective view of a configuration of a chassis member used in the power storage device according to another exemplary configuration.
Figure 10:
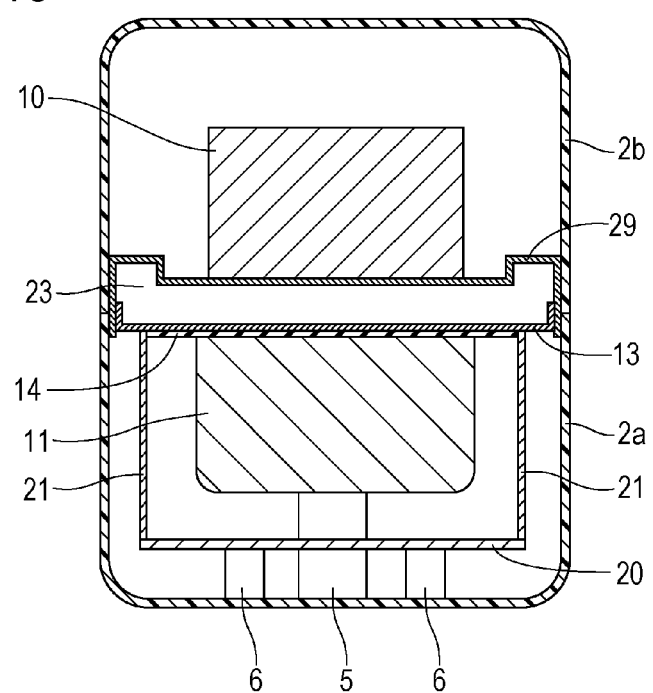
FIG. 10 is a transverse cross-sectional view of a power storage device according to another exemplary configuration.

FIGS. 8 to 10 illustrate a modification which uses a chassis member 29 formed by partially modifying the chassis member 12. FIG. 8 is an exploded perspective view of a configuration of a power storage device 1 in which the chassis member 29 of this modification is used. FIG. 9 is a perspective view of a configuration of a chassis member 13 and the chassis member 29 formed by partially modifying the chassis member 12. FIG. 10 is a transverse cross-sectional view of the power storage device 1 in which the chassis member 29 of this modification is used.

The chassis member 29 is made from a metallic material and is provided with a main surface portion 29a and side surface portions 29b. The battery module 10 is fixed closely to the main surface portion 29a. The side surface portions 29b are formed by bending side edges of the main surface portion 29a substantially vertically to the main surface portion 29a. Each of the side surface portions 29b includes a protrusion 29e formed by bending each side edge of the main surface portion 29a toward the battery module 10 and then bending in a pillar shape. The chassis member 29 is provided with a fixing portion 29c formed to extend substantially vertically to the main surface portion 29a from the lower end of the main surface portion 29a. The fixing portion 29c is formed to extend from the chassis member 29 on the side on which the battery module 10 is fixed. The chassis member 29 may further be provided with a fixing portion 29d which is formed to extend substantially vertically to the main surface portion 29a from an upper end of the main surface portion 29a. The fixing portion 29d is formed to extend toward the chassis member 13.

The modification described above which uses the chassis member 29 formed by partially modifying the chassis member 12 is an example. The chassis member 13 may be formed such that each of the side edges of the main surface portion 13a of the chassis member 13 is bent toward the inverter 11 and is provided with a protrusion formed by bending the side edge in a pillar shape. Alternatively, each of the side edges of the main surface portion 12a of the chassis member 12 and the side edges of the main surface portion 13a of the chassis member 13 may have a protrusion formed by bending each of the side edges in a pillar shape.

1-2-2. Second Modification

Figure 11:
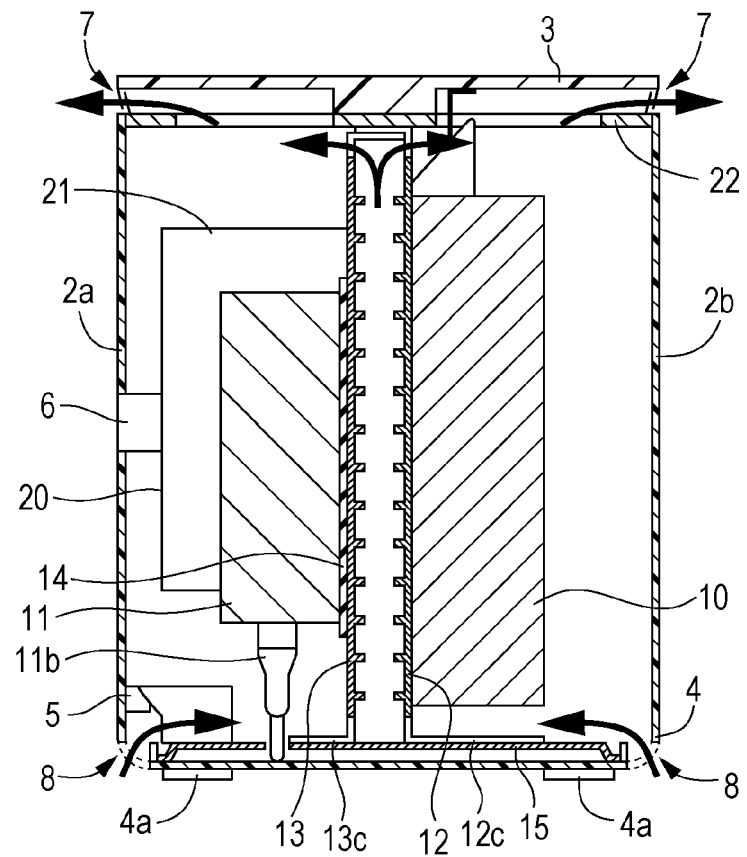
FIG. 11 is a longitudinal cross-sectional view of a power storage device according to another exemplary configuration.

FIG. 11 illustrates a modification in which a modified chassis member 12 and a modified chassis member 13 are used. The chassis member 12 is provided with a protrusion which functions as a heat-radiation fin in the main surface portion 12a on the side of the gap portion 23. The chassis member 13 is provided with the same protrusion in the main surface portion 13a on the side of the gap portion 23. FIG. 11 is a longitudinal cross-sectional view of the power storage device 1 in which the chassis member 12 and the chassis member 13 of the modification is used.

The protrusion provided in the main surface portion 12a of the chassis member 12 on the side of the gap portion 23 may increase a surface area of the chassis member 12 on the side of the gap portion 23. Therefore, a heat radiation effect by the air flowing along the gap portion 23 may be enhanced. The protrusion provided in the main surface portion 13a of the chassis member 13 on the side of the gap portion 23 may increase a surface area of the chassis member 13 on the side of the gap portion 23. Therefore, a heat radiation effect by the air flowing along the gap portion 23 may be enhanced. Such a protrusion which functions as a heat-radiation fin is desirably provided in at least one of the chassis member 12 and the chassis member 13 and especially desirably provided in the chassis member 13 to which the inverter 11 that generates a large amount of heat is fixed.

1-2-3. Third Modification

Figure 12:
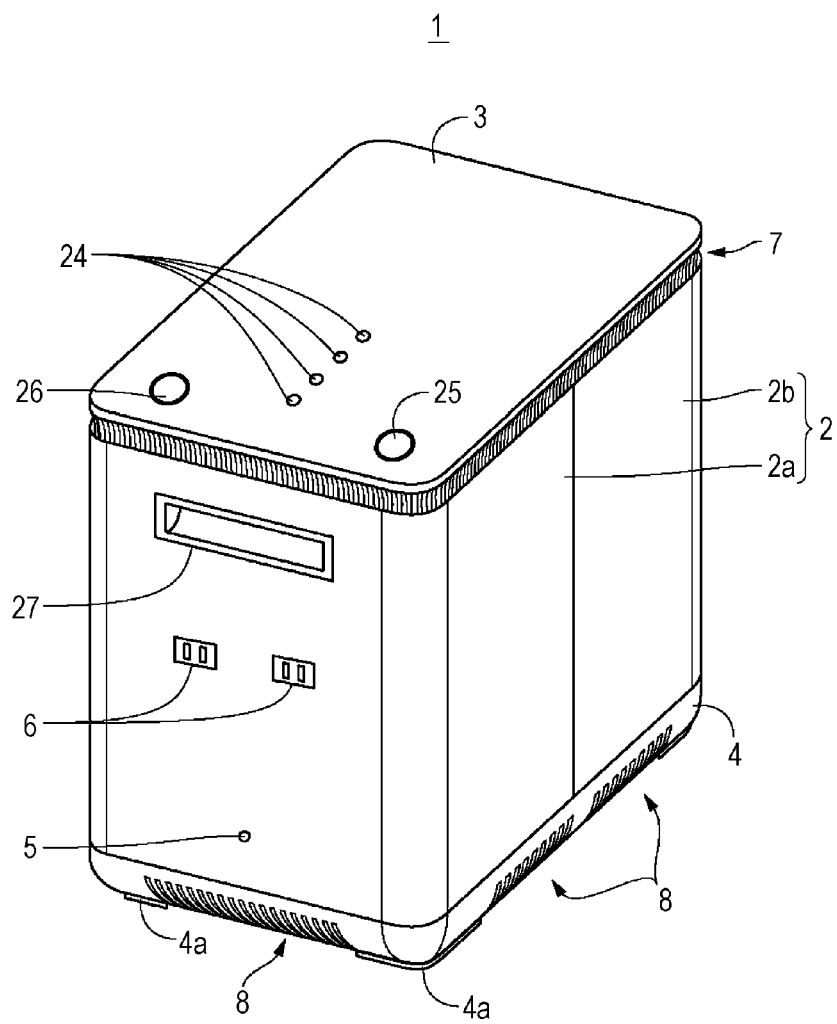
FIG. 12 is a perspective view of an exterior of a power storage device according to another exemplary configuration.

FIG. 12 illustrates an exterior perspective view of a power storage device 1 of a third modification. The power storage device 1 of the third modification may be provided with an LED lamp 24, an output ON/OFF button 25 and a remaining amount display button 26 on an upper lid 3 thereof The LED lamp 24 is provided to, for example, display a remaining amount of a battery module 10. The output ON/OFF button 25 is provided to start/stop supply of power to electronic equipment when, for example, the electronic equipment is connected to a power outlet 6. The remaining amount display button 26 is pressed by a user when the user wants to know a remaining amount of charge of the power storage device 1. When the user presses the remaining amount display button 26, the LED lamp 24 is turned on. It is desirable that the remaining amount display button 26 is not operated when, for example, the battery module 10 is being charged and the power outlet 6 and the electronic equipment are connected to each other for the power supply.

A handle 27 may be provided in at least one of the housing 2a and the housing 2b of the power storage device 1. It is possible that the power storage device 1 is carried or moved. The handle 27 may make carrying and moving of the power storage device 1 easy. For this reason, it is desirable to provide the handle 27 in at least the front (i.e., the housing 2a) of the power storage device 1.

2. Second Embodiment

As a second embodiment, an application of the power storage device according to the first embodiment will be described.

Examples of the power storage devices include a power supply for power storage for buildings, such as home, or for power generation equipment.

Hereinafter, an exemplary power storage system which uses the power storage device of the present application will be described.

This power storage system may have the following first to sixth exemplary configurations. The first power storage system is provided with the power storage device described in the first embodiment and supplies electronic equipment connected to the power storage device with power. The second power storage system has a power generation device which charges a power storage device by a power generation device which generates power from renewable energy. The third power storage system is electronic equipment which receives power supply from a power storage device. These power storage systems are implemented as systems that cooperate with an external power supply network to provide efficient power supply.

The fourth power storage system is an electric vehicle provided with a converter and a control device. The converter converts power supplied from a power storage device into driving force of the vehicle. The control device carries out information processing regarding vehicle control in accordance with information about the power storage device. The fifth power storage system is an electric power system provided with electric power information transmitter/receptor which transmits and receives signals to and from other equipment via a network. The electric power system carries out charge and discharge control of the power storage device described above in accordance with information received by the transmitter/receptor. The sixth power storage system is an electric power system which receives power supply from the power storage device described above or supplies the power storage device with power from a power generation device or a power network. Hereinafter, the power storage system will be described.

2-1. Power Storage System for Home as Application

Figure 13:
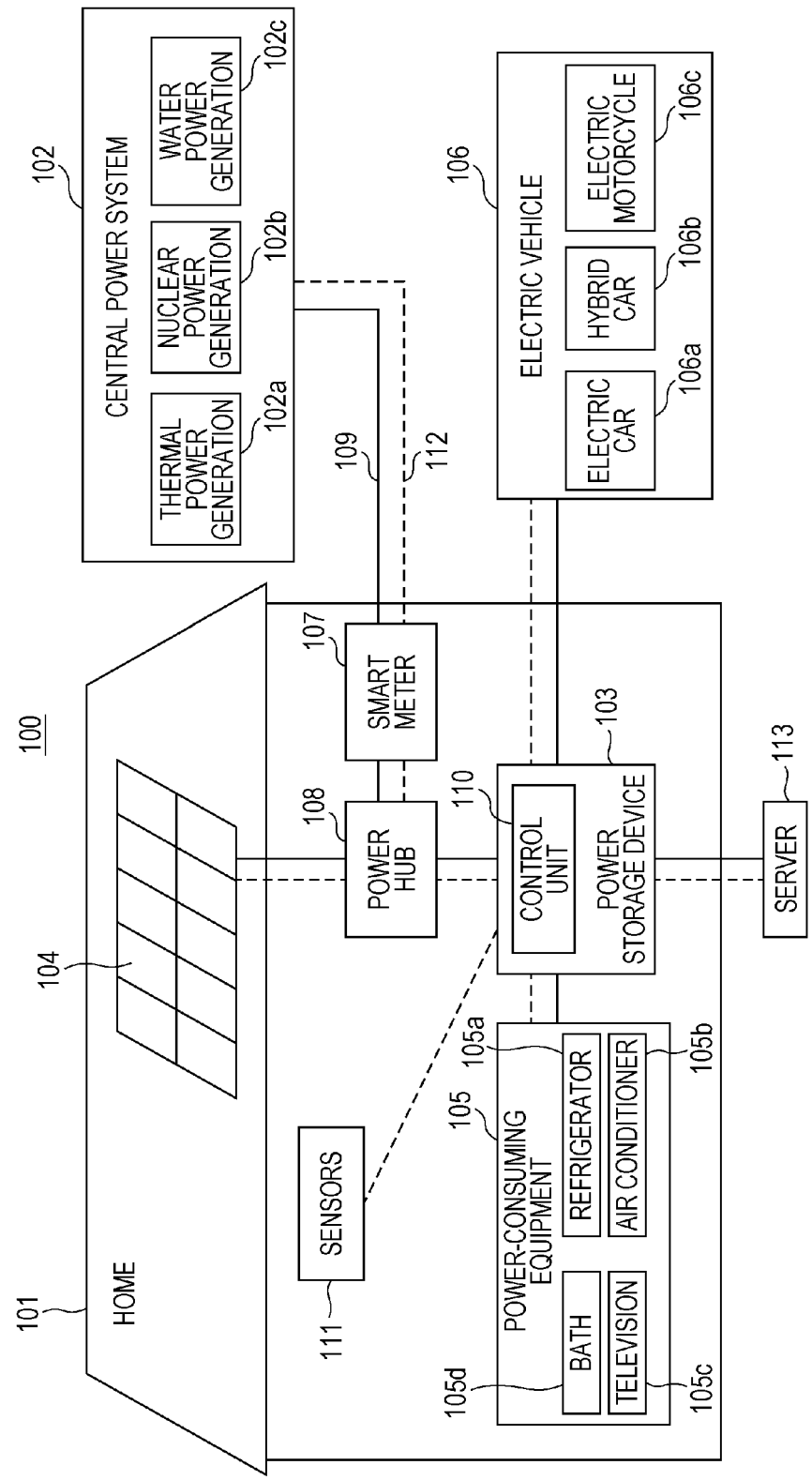
FIG. 13 is a schematic diagram of an exemplary power storage system according to a second embodiment to which power storage device according to the first embodiment is applied.

An application of the power storage device 1 of the present application to a power storage system for homes will be described with reference to FIG. 13. For example, in a power storage system 100 for a home 101, power is supplied to a power storage device 103 from a central power system 102 including, for example, thermal power generation 102a, nuclear power generation 102b and water power generation 102c via, for example, a power network 109, an information network 112, a smart meter 107 and a power hub 108. The power storage device 103 applied to the power storage system for homes may be the power storage device 1 according to the first embodiment. Power is supplied to the power storage device 103 from independent power supply, such as a home power generation device 104. Power supplied to the power storage device 103 is stored. Power is supplied using the power storage device 103 to be used in the home 101. The same power storage system may be applied to buildings.

The home 101 is equipped with the power generation device 104, power-consuming equipment 105, the power storage device 103, a control device 110 which controls each of the devices, the smart meter 107, and sensors 111 which obtain various kinds of information. The devices are connected to one another by the power network 109 and the information network 112. The power generation device 104 may be, for example, solar battery or fuel battery. The generated power is supplied to the power-consuming equipment 105 and/or the power storage device 103. Examples of the power-consuming equipment 105 include a refrigerator 105a, air-conditioning equipment (i.e., an air conditioner) 105b, a television set (i.e., a TV) 105c, and a bath 105d. The electric vehicle 106 is also included in the power-consuming equipment 105. Examples of the electric vehicle 106 include an electric car 106a, a hybrid car 106b and an electric motorcycle 106c.

The smart meter 107 has a function to measure a consumed amount of commercial electric power and transmit the measured consumed amount to an electric power company. The power network 109 may be any of DC power supply, AC power supply, and non-contact power supply, or any combination thereof The sensors 111 may be, for example, a human sensor, an illuminance sensor, an object detection sensor, a power consumption sensor, a vibration sensor, a contact sensor, a temperature sensor and an infrared sensor. Information obtained by the sensors 111 is transmitted to the control device 110. In accordance with the information from the sensors 111, a weather condition, human condition, and so forth may be learned, whereby the power-consuming equipment 105 may be controlled automatically to minimize energy consumption. The control device 110 may transmit information about the home 101 to, for example, an external electric power company via the Internet.

The power hub 108 carries out such processes as branching of power lines and DC-AD conversion. The control device 110 and the information network 112 connected thereto may communicate with each other using a communication interface or using a sensor network under wireless communication standards. The communication interface may be, for example, the Universal Asynchronous Receiver-Transceiver (UART). The sensor network may be, for example, the Bluetooth, the ZigBee and the Wi-Fi. The Bluetooth system may be applied to multimedia communications and for carrying out one-to-many connections. The ZigBee uses a physical layer of Institute of Electrical and Electronics Engineers (IEEE) 802.15.4. IEEE 802.15.4 is a name of short-distance wireless network standard called Personal Area Network (PAN) or Wireless PAN (WPAN).

The control device 110 is connected to an external server 113. The server 113 may be managed by any of the home 101, an electric power company and a service provider. Information which server 113 transmits and receives is, for example, power consumption information, life pattern information, power rates, weather information, natural disaster information, and information about power trade. Such information may be transmitted and received from home power-consuming equipment (e.g., a television set) or may be transmitted and received from devices outside the home (e.g., a mobile phone). Such information may be displayed on equipment having a displaying function, such as the television set, the mobile phone and Personal Digital Assistants (PDA).

The control device 110 which controls each component includes a central processing unit (CPU), random access memory (RAM), read only memory (ROM), and so forth and is stored in the power storage device 103 in the present embodiment. The control device 110 is connected to the power storage device 103, the power generation device 104, the power-consuming equipment 105, the sensors 111 and the server 113 by the information network 112. The control device has, for example, a function to adjust the consumed amount of commercial electric power and the amount of generated electricity. Further, the control device 110 may have, for example, a function to carry out power trade in an electricity market.

As described above, the power storage device 103 may be provided not only with the central power system 102 which uses the thermal power generation 102a, the nuclear power generation 102b and the water power generation 102c, but with generated power of the power generation device 104 (i.e., photovoltaic power generation and wind power generation). Therefore, even if generated power of the power generation device 104 fluctuates, the control device 110 make the amount of power output to the outside be constant or make a necessary amount of power be discharged. For example, it is possible that power generated by photovoltaic power generation is stored in the power storage device 103 and less expensive midnight power is stored in the power storage device 103 during the nighttime, and the power stored by the power storage device 103 may be discharged in daytime during which electricity is expensive.

Although the control device 110 is incorporated in the power storage device 103 in this example, the control device 110 may be incorporated in the smart meter 107 or may be provided independently. The power storage system 100 may be used for plural homes in a housing complex or may be used in plural single-family homes.

Although the present application has been described with reference to the embodiments and the modifications, the present application is not limited thereto: the present application may be changed in various ways. The position and size of each component of the power storage device may be determined arbitrarily.

This present technique may be implemented in the following manner.

[1] A power storage device, including: a first chassis member which is formed from a metallic material and is provided with a vertically extending first main surface portion, and first and second side surface portions formed to extend from each of side edges of the first main surface portion substantially vertically to the first main surface portion; a second chassis member which is formed from a metallic material and is provided with a second main surface portion which faces the main surface portion of the first chassis member, and third and fourth side surface portions formed to extend from each of side edges of the second main surface portion substantially vertically to the second main surface portion; a power inlet capable of inputting either of DC power or AC power; one or plural power outlets to which a plug of electronic equipment is capable of being connected; a battery module to which one or plural secondary batteries are connected and which is charged by being supplied with the power input from the power inlet; a power conversion device which is electrically connected to the battery module, and which converts the power input from the battery module into desired power and outputs the converted power to the one or plural power outlets; a housing which contains the battery module, the power conversion device, the first chassis member, the second chassis member, the power inlet and the one or plural power outlets, and makes the power inlet and the power outlet be exposed outside; a lower lid which is formed integrally with or is fit into the housing on a bottom surface side of the housing and is provided with plural openings; and an upper lid which is formed integrally with or is fit into an upper surface side of the housing and is provided with plural openings, wherein: the battery module is fixed closely to one surface of the first main surface portion of the first chassis member; the power conversion device is fixed closely to one surface of the second main surface portion of the second chassis member; and a gap portion is formed between the first main surface portion and the second main surface portion by disposing the other surface of the first main surface portion of the first chassis member and the other surface of the second main surface portion of the second chassis member to face each other, the space being open at a bottom surface side and an upper surface side and being used for making air taken through the plural openings of the lower lid flow via the plural openings of the upper lid.

[2] The power storage device according to [1], wherein the gap portion is formed between the first main surface portion and the second main surface portion by fixing the first side surface portion and the third side surface portion to each other, and fixing the second side surface portion and the fourth side surface portion to each other.

[3] The power storage device according to [2], wherein: the first side surface portion and the third side surface portion are fixed together with one surface of the housing; the second side surface portion and the fourth side surface portion are fixed together with the other surface which faces the one surface of the housing; and a first space surrounded by the first chassis member and the housing and a second space surrounded by the second chassis member and the housing are formed.

[4] The power storage device according to any one of [1] to [3], further including protrusions formed by bending each of side edges of at least one of the first main surface portion of the first chassis member and the second main surface portion of the second chassis member, wherein: if the protrusions are provided in the first main surface portion, the protrusions are made to protrude in the plane direction of one surface of the first main surface portion; and if the protrusions are provided in the second main surface portion, the protrusions are made to protrude in the plane direction of the second main surface portion.

[5] The power storage device according to any one of [1] to [4] wherein the width of the gap portion is 5 mm or greater and 30 mm or less.

[6] The power storage device according to [5], wherein each of the plural openings provided in the lower lid and the plural openings provided in the upper lid is a slit.

[7] The power storage device according to [6], wherein the width of the slit is 0.5 mm or greater and 2.5 mm or less.

[8] The power storage device according to any one of [1] to [7] which the housing is made from a metal plate.

[9] The power storage device according to [8] wherein the housing is an aluminum plate.

[10] The power storage device according to any one of [1] to [9], wherein the second main surface portion of the second chassis member and the power conversion device are in close contact with each other via an insulating member.

[11] The power storage device according to any one of [1] to [9], wherein the first main surface portion of the first chassis member and the battery module are in close contact with each other via a heat-radiation member.

[12] The power storage device according to [11], wherein: the heat-radiation member is a part of the battery module; and the heat-radiation member is provided to be exposed to the battery module on the first chassis member side.

[13] The power storage device according to [12], wherein the heat-radiation member is made of silicon.

[14] The power storage device according to [1], wherein the power conversion device is an inverter which converts DC power output from the battery module into AC power and outputs the AC power to the one or plural power outlets.

[15] The power storage device according to [1], wherein plural protrusions are provided in at least one of the other surface of the first main surface portion of the first chassis member and the other surface of the second main surface portion of the second chassis member.

[16] The power storage device according to [1], wherein one or plural handles are provided at a part of the housing.

[17] A power storage system, wherein power is supplied from the power storage device according to [1] or power is supplied to the power storage device from a power generation device or a power network.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A power storage device, comprising:
   a first chassis member which is formed from a metallic material and is provided with a vertically extending first main surface portion, and first and second side surface portions formed to extend from each of side edges of the first main surface portion substantially vertically to the first main surface portion;
   a second chassis member which is formed from a metallic material and is provided with a second main surface portion which faces the main surface portion of the first chassis member, and third and fourth side surface portions formed to extend from each of side edges of the second main surface portion substantially vertically to the second main surface portion;
   a power inlet capable of inputting either of DC power or AC power;
   one or plural power outlets to which a plug of electronic equipment is capable of being connected;
   a battery module to which one or plural secondary batteries are connected and which is charged by being supplied with the power input from the power inlet;
   a power conversion device which is electrically connected to the battery module, and which converts the power input from the battery module into desired power and outputs the converted power to the one or plural power outlets;
   a housing which contains the battery module, the power conversion device, the first chassis member, the second chassis member, the power inlet and the one or plural power outlets, and makes the power inlet and the power outlet be exposed outside;
   a lower lid which is formed integrally with or is fit into the housing on a bottom surface side of the housing and is provided with plural openings; and
   an upper lid which is formed integrally with or is fit into an upper surface side of the housing and is provided with plural openings,
   wherein
   the battery module is fixed closely to one surface of the first main surface portion of the first chassis member;
   the power conversion device is fixed closely to one surface of the second main surface portion of the second chassis member; and
   a gap portion is formed between the first main surface portion and the second main surface portion by disposing the other surface of the first main surface portion of the first chassis member and the other surface of the second main surface portion of the second chassis member to face each other, the space being open at a bottom surface side and an upper surface side and being used for making air taken through the plural openings of the lower lid flow via the plural openings of the upper lid.

2. The power storage device according to claim 1, wherein the gap portion is formed between the first main surface portion and the second main surface portion by fixing the first side surface portion and the third side surface portion to each other, and fixing the second side surface portion and the fourth side surface portion to each other.

3. The power storage device according to claim 2, wherein:
   the first side surface portion and the third side surface portion are fixed together with one surface of the housing;
   the second side surface portion and the fourth side surface portion are fixed together with the other surface which faces the one surface of the housing; and
   a first space surrounded by the first chassis member and the housing and a second space surrounded by the second chassis member and the housing are formed.

4. The power storage device according to claim 1, further comprising protrusions formed by bending each of side edges of at least one of the first main surface portion of the first chassis member and the second main surface portion of the second chassis member, wherein:
   if the protrusions are provided in the first main surface portion, the protrusions are made to protrude in the plane direction of one surface of the first main surface portion; and
   if the protrusions are provided in the second main surface portion, the protrusions are made to protrude in the plane direction of the second main surface portion.

5. The power storage device according to claim 1, wherein the width of the gap portion is 5 mm or greater and 30 mm or less.

6. The power storage device according to claim 1, wherein each of the plural openings provided in the lower lid and the plural openings provided in the upper lid is a slit.

7. The power storage device according to claim 6, wherein the width of the slit is 0.5 mm or greater and 2.5 mm or less.

8. The power storage device according to claim 1, wherein the housing is made from a metal plate.

9. The power storage device according to claim 8, wherein the housing is made from an aluminum plate.

10. The power storage device according to claim 1, wherein the second main surface portion of the second chassis member and the power conversion device are in close contact with each other via an insulating member.

11. The power storage device according to claim 1, wherein the first main surface portion of the first chassis member and the battery module are in close contact with each other via a heat-radiation member.

12. The power storage device according to claim 11, wherein: the heat-radiation member is a part of the battery module; and the heat-radiation member is provided to be exposed to the battery module on the first chassis member side.

13. The power storage device according to claim 12, wherein the heat-radiation member is made of silicon.

14. The power storage device according to claim 1, wherein the power conversion device is an inverter which converts DC power output from the battery module into AC power and outputs the AC power to the one or plural power outlets.

15. The power storage device according to claim 1, wherein plural protrusions are provided in at least one of the other surface of the first main surface portion of the first chassis member and the other surface of the second main surface portion of the second chassis member.

16. The power storage device according to claim 1, wherein one or plural handles are provided at a part of the housing.

17. A power storage system, wherein power is supplied from the power storage device according to claim 1 or power is supplied to the power storage device from a power generation device or a power network.

* * * * *